UNITED STATES PATENT OFFICE.

TOMMASO DI TULLIO, OF QUINCY, MASSACHUSETTS, ASSIGNOR TO ORLANDO PACE, TRUSTEE, OF QUINCY, MASSACHUSETTS.

BOILER COMPOUND.

No. 853,535.

Specification of Letters Patent.

Patented May 14, 1907.

Application filed September 27, 1906. Serial No. 336,424.

*To all whom it may concern:*

Be it known that I, TOMMASO DI TULLIO, of Quincy, in the county of Norfolk and State of Massachusetts, have invented certain new and useful Improvements in Boiler-Cleaning Compounds, of which the following is a specification.

This invention has for its object to provide a composition for use in cleaning steam and hot water boilers, and removing rust and other incrustations from the inner surfaces thereof that are exposed to water and steam.

The invention consists in the composition which I will now proceed to describe and claim.

The essential elements of my improved composition and the preferred proportions of the same are as follows: powdered extract quebracha 22 pounds powdered bicarbonate of soda 2 pounds powdered sal ammoniac 4 pounds powdered pulvis eucalyptus 7 pounds.

The above-mentioned ingredients are mixed in a dry, powdered or granular form, producing a dry compound which is soluble in water. A suitable quantity of the said composition added to the charge of water in a steam boiler will act quickly and efficiently in removing rust, scale and other foreign matter deposited on the surfaces of the boiler.

I prefer to add to the above-described composition the following ingredients in the proportions hereinafter named, to wit: crystallized soda 2 pounds Chinese soda 2 pounds. The last-mentioned ingredients may, however, be omitted, although I have found that their employment is advisable.

I claim:

1. A boiler-cleaning composition, consisting of extract quebracha, bicorbonate of soda, sal ammoniac, and pulvis eucalyptus.

2. A boiler-cleaning composition consisting of extract quebracha, bicarbonate of soda, sal ammoniac, pulvis eucalyptus, crystallized soda and Chinese soda.

In testimony whereof I have affixed my signature, in presence of two witnesses.

TOMMASO DI TULLIO.

Witnesses:
 ORLANDO PACE,
 C. F. BROWN.